(12) United States Patent
Leenknegt et al.

(10) Patent No.: US 12,727,533 B2
(45) Date of Patent: Sep. 8, 2026

(54) COMBINE HARVESTER WITH GRAIN CART DETECTION

(71) Applicants: CNH Industrial Belgium N.V., Zedelgem (BE); CNH Industrial America LLC, New Holland, PA (US)

(72) Inventors: Arno Leenknegt, Hooglede (BE); Thomas Mahieu, West-Vleteren (BE); Bart M. A. Missotten, Herent (BE); Nathan Isaac, Lancaster, PA (US); Michael Rush, Lancaster, PA (US); Joseph Best, Leola, PA (US)

(73) Assignees: CNH Industrial Belgium N.V., Zedelgem (BE); CNH Industrial America LLC, New Holland, PA (US)

( * ) Notice: Subject to any disclaimer, the term of this patent is extended or adjusted under 35 U.S.C. 154(b) by 310 days.

(21) Appl. No.: 18/609,369

(22) Filed: Mar. 19, 2024

(65) Prior Publication Data

US 2024/0315170 A1 Sep. 26, 2024

(30) Foreign Application Priority Data

Mar. 20, 2023 (EP) .................................... 23162818

(51) Int. Cl.
*A01D 41/12* (2006.01)
*A01D 41/127* (2006.01)
*G01S 13/931* (2020.01)

(52) U.S. Cl.
CPC ..... *A01D 41/1217* (2013.01); *A01D 41/1243* (2013.01); *A01D 41/127* (2013.01); *A01D 41/1278* (2013.01); *G01S 13/931* (2013.01)

(58) Field of Classification Search
CPC ............ A01D 41/1274; A01D 41/1217; A01D 41/1243; A01D 41/1278; A01D 43/073;
(Continued)

(56) References Cited

U.S. PATENT DOCUMENTS

2006/0150584 A1 7/2006 Weiss
2012/0215394 A1* 8/2012 Wang .................. A01B 69/008 701/50

(Continued)

FOREIGN PATENT DOCUMENTS

EP 3400798 A1 11/2018
EP 3939403 A1 1/2022

(Continued)

OTHER PUBLICATIONS

European Search Report Corresponding to EP23162818 on Aug. 28, 2023.

*Primary Examiner* — Brad Harcourt
(74) *Attorney, Agent, or Firm* — Dority & Manning, P.A.

(57) ABSTRACT

A combine harvester with a grain tank for storing harvested grain, an unload conveyor for unloading the harvested grain stored in the grain tank into a nearby grain hauling vehicle, a chopper for chopping residue straw, and a spreader system for spreading the chopped residue straw in an area behind the combine harvester. The combine harvester further includes a radar-based residue monitoring system for monitoring a spreading distribution of the chopped residue straw. A controller is configured to receive sensor signals from one or more radar sensors of the radar-based residue monitoring system, and to detect a presence of the nearby grain hauling vehicle based on the received sensor signals.

15 Claims, 3 Drawing Sheets

(58) Field of Classification Search

CPC .. A01D 41/00; A01D 41/1208; A01D 41/127; A01D 41/1272; A01D 41/1275; G01S 2013/9315; G01S 2013/93272; G01S 13/88

See application file for complete search history.

(56) References Cited

U.S. PATENT DOCUMENTS

| | | | | |
|---|---|---|---|---|
| 2013/0213518 | A1 | 8/2013 | Bonefas | |
| 2018/0338422 | A1* | 11/2018 | Brubaker | A01D 41/1208 |
| 2021/0127573 | A1 | 5/2021 | Mahieu et al. | |
| 2022/0018955 | A1* | 1/2022 | Christiansen | A01D 43/073 |
| 2024/0028048 | A1* | 1/2024 | Rust | G05D 1/695 |
| 2024/0069552 | A1* | 2/2024 | Creaby | G05D 1/0276 |

FOREIGN PATENT DOCUMENTS

| | | | |
|---|---|---|---|
| EP | 3939404 | A1 | 1/2022 |
| EP | 3939409 | A1 | 1/2022 |
| EP | 4212003 | A1 | 7/2023 |
| WO | WO2009/115404 | A1 | 9/2009 |
| WO | WO2015/177188 | A1 | 11/2015 |
| WO | WO2018/162699 | A1 | 9/2018 |
| WO | WO2019/215185 | A1 | 11/2019 |

* cited by examiner

COMBINE HARVESTER WITH GRAIN CART DETECTION

CROSS-REFERENCE TO RELATED APPLICATIONS

The present application is based upon and claims the right of priority to EP patent application Ser. No. 23/162,818.1, filed Mar. 20, 2023, the disclosure of which is hereby incorporated by reference herein in its entirety for all purposes.

TECHNICAL FIELD

The present invention relates to a combine harvester comprising a grain tank for storing harvested grain, an unload conveyor for unloading the harvested grain stored in the grain tank into a nearby grain hauling vehicle, a chopper for chopping residue straw, and a spreader system for spreading the chopped residue straw in an area behind the combine harvester. The present invention further relates to a method and software for controlling such a combine harvester.

BACKGROUND

Combine harvesters are complex machines with many structural and functional parts, arranged to perform a plurality of different functions related to the harvesting of grain and grain-like crops. The main functions of a combine harvester include the cutting and taking in of the crop, threshing the grains from the stalks in a threshing section, separating the chaff from the grain kernels in a cleaning section, and releasing the straw and chaff residue from the harvester.

The cleaned grain is typically stored in a large grain tank that is periodically emptied through an unload conveyor into a grain hauling vehicle. The unloading of the grain tank may, for example, happen at the edge of the field, while standing still, or while harvesting in the field with the grain hauling vehicle driving next to the combine harvester. The grain hauling vehicle usually is a grain cart or large trailer pulled by a tractor, but could be a truck with a large loading space, or any other type of drivable loading space suitable for receiving large volumes of grain.

The release of straw residue behind the combine harvester may be done by dropping the straw in a swath on the field, for example to allow it being picked up by a baler later. Often, however, the straw residue is chopped into smaller pieces and spread over the field across the full width of the header, together with the chaff coming from the cleaning section. When spread over the field, the residue crop material serves as fertilizer for the soil. In the international patent application published as WO 2018/162699 A1, the use of radar sensors, installed at the rear of the harvester, below the spreader system, is disclosed for monitoring the particle size and spatial distribution of the chopped and expelled residue particles.

In the combine harvester described in WO 2015/177188 A1, radar sensors are placed at lateral sides of the harvester body for detecting persons and other obstacle detection appearing in a danger zone around the harvester. WO 2019/215185 A1 and EP 3 939 403 A1 describe the use of a radar sensor provided in or at a side panel of the harvester body, just underneath the unloading tube, for monitoring the grain unloading process.

The increasing use of such high-tech sensing systems adds to the cost and complexity of modern agricultural harvesters and may bring increased maintenance costs and downtime for repairs It is an aim of the present invention to address one or more disadvantages associated with the prior art.

SUMMARY OF THE INVENTION

According to an aspect of the invention there is provided a combine harvester with a grain tank for storing harvested grain, an unload conveyor for unloading the harvested grain stored in the grain tank into a nearby grain hauling vehicle, a chopper for chopping residue straw, and a spreader system for spreading the chopped residue straw in an area behind the combine harvester. The combine harvester further comprises a radar-based residue monitoring system for monitoring a spreading distribution of the chopped residue straw. A controller is configured to receive sensor signals from one or more radar sensors of the radar-based residue monitoring system, and to detect a presence of the nearby grain hauling vehicle based on the received sensor signals.

With the radar-based residue monitoring system according to the invention, the combine harvester makes optimal use of the availability and technical capabilities of the radar sensors in the residue monitoring system. The inventors have realised that, even though these already available radar sensors may not be optimally positioned and tuned for performing all the functions of a more classical type parking sensor as, e.g., disclosed in WO 2015/177188 A1, they can be configured to be very useful for detecting the presence of nearby grain hauling vehicles. In recent decades, with the advancement of technology, and an increased focus on the efficient use of expensive agricultural machinery, the width of combine harvester headers has been increasing. As a result, it has become more and more common for the grain hauling vehicle to drive behind the header and close to the body of the combine harvester during unloading of the grain tank. Especially in these locations, the radar sensor of the residue monitoring system can be advantageously used for grain hauling vehicle detection. When detecting the presence of a grain hauling vehicle in the direct vicinity of the combine harvester, the controller may, for example, provide a warning signal to the driver, set up a direct communication signal between the combine harvester and the grain hauling vehicle, or automatically control one or more functional parts of the vehicles in order to avoid damage or to prepare the relevant systems for an upcoming grain transfer between the two vehicles.

Preferably, the controller is further configured to determine not just the presence but also a position of the nearby grain hauling vehicle relative to the combine harvester, based on the received sensor signals. When knowing the exact position of the grain hauling vehicle relative to the combine harvester, this can, e.g., be used for guiding the grain hauling vehicle and facilitating the process of unloading the content of the grain tank into the grain hauling vehicle, without unnecessary grain loss or damage to one of the vehicles.

While the vehicle guidance may be provided in the form of position information and/or driving instructions presented to the drivers of both vehicles, the controller may advantageously be configured to control a driving speed and/or a driving direction of the combine harvester and/or the nearby grain hauling vehicle, in dependence of the relative position of the nearby grain hauling vehicle.

In preferred embodiments, the controller is further configured to control an orientation of the unload conveyor relative to the grain tank, in dependence of the relative position of the nearby grain hauling vehicle. The control of the orientation of the grain conveyor, possibly in combination with the control of the relative positions of the combine harvester and the grain hauling vehicle, helps to improve the efficiency and accuracy of the unloading process while reducing the risk of collision.

In further preferred embodiments of the combine harvester according to the invention, the controller is further configured to control an operation of the spreader system, in dependence of the presence of the nearby grain hauling vehicle. For example, the spreader system may be turned off when the grain hauling vehicle moves into the spreading region of the combine harvester. This way, it may be avoided that the grain hauling vehicle is soiled or damaged by the spray of chopped crop residue coming from the spreaders. Furthermore, temporarily turning off the spreaders may help to improve vision for the driver, or the camera systems, of the grain hauling vehicle while approaching or driving through the dusty clouds of chopped straw. Instead of completely turning off the spreader system, the controller may adjust the spreader direction or turn off only the spreader at the side of the combine harvester where the grain hauling vehicle is detected while continuing to spread chopped crop residue at the other side.

In some embodiments, the radar-based residue monitoring system may be configured to be operated in one of at least two distinct detection modes, i.e., a spreader mode and a non-spreader mode. In the spreader mode, the radar-based residue monitoring system is configured to emit a radar signal with a waveform adapted for monitoring the spreading distribution of the chopped residue straw. In the non-spreader mode, the radar-based residue monitoring system is configured to emit a radar signal with a waveform adapted for detecting vehicles or stationary obstacles.

Radar systems especially configured to detect small, fast moving objects like chopped straw from a residue spreader may not be optimally configured to detect larger objects moving at relatively low speeds relative to the radar system. According to embodiments of the invention, the radar-based residue monitoring system may run in the spreader mode while the combine is harvesting crop and chopping and spreading the crop residue over the field. Upon, for example, a user command, a signal from an approaching grain hauling vehicle, or an initial detection of the grain hauling vehicle by the radar-based residue monitoring system, the controller may reconfigure the radar-based residue monitoring system to switch to the non-spreader mode, possibly in combination with pausing or redirecting the residue spreading. When the grain unloading process is completed and the grain hauling vehicle moves away from the combine harvester, the combine harvester can resume its normal harvesting operation and the controller may bring the radar-based residue monitoring system back into the spreader-mode.

According to a further aspect of the invention, a method and software is provided for controlling a combine harvester. The method comprises receiving sensor signals from one or more radar sensors of a radar-based residue monitoring system of the combine harvester, and based on the received sensor signals detect a presence of a nearby grain hauling vehicle.

BRIEF DESCRIPTION OF THE DRAWINGS

Embodiments of the invention will now be described by way of example with reference to the accompanying drawings, in which.

DETAILED DESCRIPTION

Figure 1:
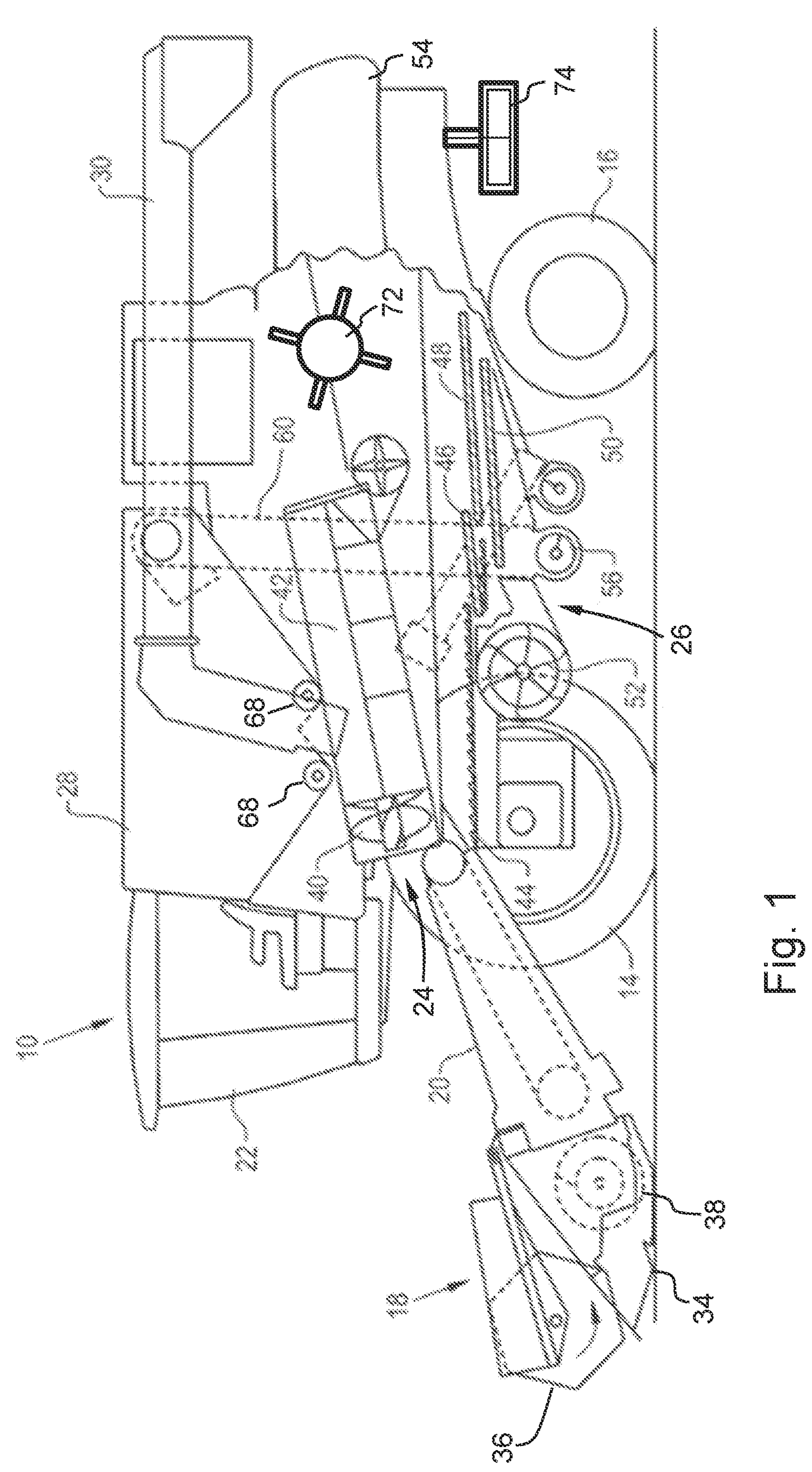
FIG. 1 schematically shows a combine harvester wherein the invention may be advantageously used.

FIG. 1 schematically shows an agricultural harvester in the form of a combine harvester 10. The combine harvester 10 generally includes front and rear round engaging wheels 14, 16, a header 18, a feeder 20, an operator cabin 22, a threshing and separation system 24, a cleaning system 26, a grain tank 28 and an unloading tube 30.

A header 18 is mounted to the front of the combine harvester 10 and includes a cutter bar 34 for severing crops from a field during forward motion of the combine. A rotatable reel 36 feeds the crop into the header 18, and a double auger 38 feeds the severed crop laterally from each side towards the feeder 20. The feeder 20 conveys the severed crop to the threshing and separation system 24.

The threshing and separation system 24 is of the axial-flow type and comprises a threshing rotor 40 at least partially located and rotatable within a threshing concave 42. The threshing concave may take the form of a perforated concave. Grain from the severed crop is threshed and separated from the material other than grain (MOG) by the action of the threshing rotor 40 within the threshing concave 42. Larger elements of MOG, such as stalks and leaves do not pass through the perforations in the threshing concave 42 and are discharged from the rear of the combine harvester 10.

The release of straw residue behind the combine harvester 10 may be done by dropping the straw in a swath on the field, for example to allow it being picked up by a baler machine later. Often, however, the straw residue is chopped into smaller pieces by a chopper 72 and spread over the field across the full width of the header 18 by a spreader system 74. The spreader system 74 typically comprises a left and a right rotary spreader, each spreading the chopped crop residue received from the chopper 72 laterally and away from the combine harvester 10. The chaff and other small MOG coming from the cleaning system 26 may be dropped on the field, spread over the field by a separate chaff spreader (not shown), or mixed in with the straw residue to be spread together therewith by the spreader system 74. The straw, chaff, and other MOG that is spread over the field serves as fertilizer for the soil.

Grain and smaller elements of MOG (small MOG henceforth), such as chaff, dust and straw are small enough to pass through the perforations in the threshing concave 42. Grain and small MOG that has successfully passed the threshing and separation system 24 falls onto a preparation pan 44 and is conveyed towards the cleaning system 26. The cleaning system comprises a series of sieves and a cleaning fan 52. The series of sieves includes a pre-cleaning sieve 46, an upper (or chaffer) sieve 48 and a lower (or shoe) sieve 50. The cleaning fan 52 generates an airflow through the sieves 46, 48, 50 that impinges on the grain and small MOG thereon. The small MOG is typically lighter than the grain and is therefore separated from the grain as it becomes airborne. The small MOG is subsequently discharged from the combine harvester 10 via a straw hood 54.

The preparation pan 44 and pre-cleaning sieve 46 oscillate in a fore-to-aft manner to transport the grain and small MOG to the upper surface of the upper sieve 48. The upper sieve 48 is arranged vertically above the lower sieve 50 and oscillates in a for-to-aft manner too, such that the grain and small MOG are spread across the two sieves 48, 50, while also permitting cleaned grain to pass through openings in the sieves 48, 50 under the action of gravity.

Cleaned grain falls to a clean grain auger 56 that is positioned below and in front of the lower sieve 50 and spans the width of the combine harvester 10. The clean grain auger 56 conveys the cleaned grain laterally to a vertical grain elevator 60, which is arranged to transport the cleaned grain to the grain tank 28. Once in the grain tank 28, grain tank augers 68 at the bottom of the grain tank convey the cleaned grain laterally within the grain tank 28 to an unloading tube 30 for discharge from the combine harvester 10.

Figure 2:
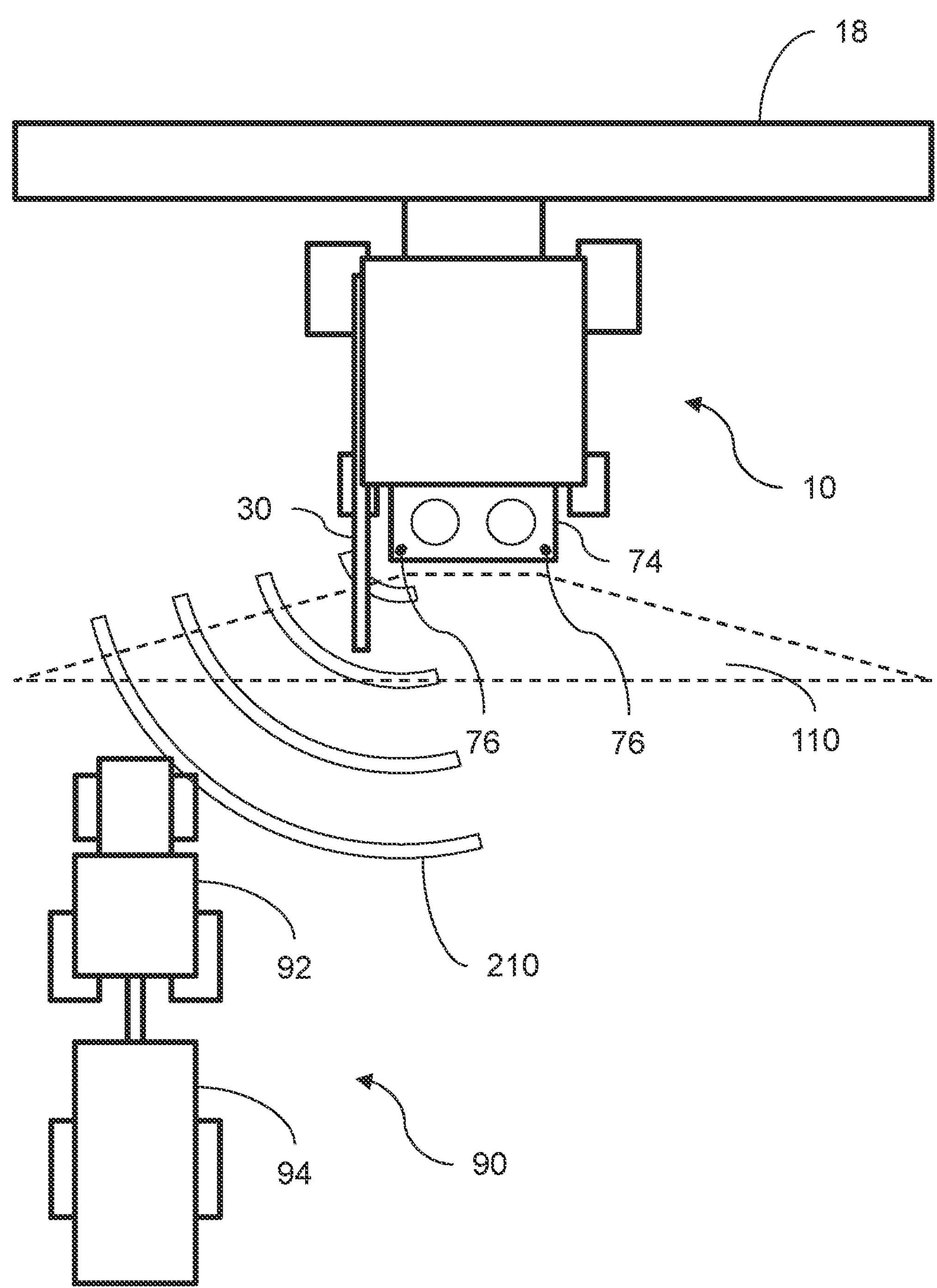
FIG. 2 schematically shows a grain hauling vehicle approaching the combine harvester for collecting clean grain stored in the grain tank of the combine harvester.

FIG. 2 schematically shows a grain hauling vehicle 90 approaching the combine harvester 10 for collecting clean grain stored in the grain tank 28 of the combine harvester 10. In this exemplary embodiment, the grain hauling vehicle 90 is a combination of a large trailer 94 and a tractor 92 pulling the trailer 94. In the following, the term grain hauling vehicle 90 will be used for any tractor-trailer combination, self-driving loading truck, or other type of drivable loading space used for the purpose of first receiving grain from the grain tank 28 of a combine harvester 10, and then transporting the collected grain away from the field to a larger grain storage facility.

The combine harvester 10 drives forward while its header 18 cuts and takes in the crop standing in the field in front of the harvester 10. The spreader system 74 spreads the chopped straw over a spreading area 110 behind the combine harvester 10. A radar-based residue monitoring system comprises two radar sensors 76 that are positioned and configured to monitor the dispersed crop residue. In alternative embodiments, the radar-based residue monitoring system may comprise only one or three or more radar sensors 76. Aspects of the residue spreading that may be monitored include particle size, particle size distribution, a width of the spreading area 110, and a distribution of the residue particles over the full width of the spreading area 110. Preferably, a controller of the combine harvester 10 is operable to control straw chopper 72 in such a way to cut the crop residue into pieces of the desired particle size. Further, the controller may control the spreader system 74 in such a way that the spreading area 110 extends along the complete width of the header 18.

As the grain hauling vehicle 90 approaches the combine harvester 10 from behind, it moves into the field of view of the radar-based residue monitoring system. Radar signals 210 emitted by the radar sensors 76 are then reflected by the grain hauling vehicle 90 and the return signals can be picked up by these radar sensors 76. According to the invention, a controller of the combine harvester 10 is configured to detect the presence of the nearby grain hauling vehicle 90 based on the received sensor signals from the radar sensors 76. The controller may be capable of detecting the grain hauling vehicle 90 using the normal radar signals 210, even though they may be optimised for detecting small, fast moving residue particles. Optionally, the radar sensors 76 are controlled to intermittently emit radar signals 210 with a waveform especially adapted for detecting slow moving vehicles 90. For example, the radar sensors 76 may be operated in the spreader mode for ten cycles, followed by one or two cycles of operation in the non-spreader mode. As soon as the presence of a grain hauling vehicle 90 or other obstacle is detected, the number of cycles of operation in each mode may be adjusted, or the radar sensors 76 may be controlled to operate in the non-spreader mode continuously until the grain hauling vehicle 76 has moved away from the combine harvester 10.

When detecting the presence of a grain hauling vehicle 90 in the direct vicinity of the combine harvester 10, the controller may, for example, provide a warning signal to the driver, set up a direct communication signal between the combine harvester 10 and the grain hauling vehicle 90, or automatically control one or more functional parts of the vehicles 10, 90 in order to avoid damage or to prepare the relevant systems for an upcoming grain transfer from the grain tank 28 to the trailer 94 of the hauling vehicle 90. The warning signal may, e.g., be shown on a display inside the driver cabin 22 and accompanied by an audible signal to draw the driver's attention to the presence of the grain hauling vehicle 90. By setting up or activating a direct communication channel between the drivers of the two vehicles 10, 90, it will be made easier to properly coordinate the movement of both vehicles 10, 90 in order to avoid collisions and provide a smooth transfer of grain from the grain tank 28 into the trailer 94 of the hauling vehicle 90.

Preferably, the controller is further configured to determine not just the presence but also a position of the nearby grain hauling vehicle 90 relative to the combine harvester 10. When knowing the exact position of the grain hauling vehicle 90, this can, e.g., be used for guiding the grain hauling vehicle 90 and facilitating the process of unloading the content of the grain tank into the grain hauling vehicle, without unnecessary grain loss or damage to one of the vehicles 10, 90.

While the vehicle guidance may be provided in the form of position information and/or driving instructions presented to the drivers of both vehicles, the controller may advantageously be configured to control a driving speed and/or a driving direction of the combine harvester and/or the nearby grain hauling vehicle, in dependence of the relative position of the nearby grain hauling vehicle. When the travel paths of one or both of the vehicles 10, 90 are controlled by autonomous or semi-autonomous driving systems, direct communication between the driving systems of both vehicles 10, 90 may improve the responsiveness and accuracy of both driving systems.

In preferred embodiments, the controller is further configured to control an orientation of the unload conveyor 30 relative to the grain tank 28, in dependence of the relative position of the nearby grain hauling vehicle 90. The control of the orientation of the grain conveyor 30, possibly in combination with the control of the relative positions of the combine harvester 10 and the grain hauling vehicle 90, helps to improve the efficiency and accuracy of the unloading process while reducing the risk of collision. For example, the controller of the combine harvester 10 may instruct to start deploying the unload conveyor 30 as soon as the hauling vehicle 90 is detected to be approaching. This deployment of the unload conveyor may be made dependent on a current filling level of the grain tank 28, or subject to a confirmation by the driver that a grain unloading process is to be initiated.

In further preferred embodiments of the combine harvester 10 according to the invention, the controller is further configured to control an operation of the spreader system 74, in dependence of the presence of the nearby grain hauling vehicle. 90. For example, the spreader system 74 or one of two spreaders of the spreader system 74 may be turned off when the grain hauling vehicle 90 moves into the spreading region 110 of the combine harvester 10. This way, it may be avoided that the grain hauling vehicle 90 is soiled or damaged by the spray of chopped crop residue coming from the spreaders 74. Furthermore, temporarily turning off the spreaders 74 may help to improve vision for the driver, or the camera systems, of the grain hauling vehicle 90 while approaching or driving through the dusty clouds of chopped straw. Instead of completely turning off the spreader system 74, as e.g. shown in FIG. 3, the controller may adjust the spreader direction or turn off only the spreader at the side of the combine harvester 10 where the grain hauling vehicle 90 is detected while continuing to spread chopped crop residue at the other side.

In some embodiments, the radar-based residue monitoring system may be configured to be operated in one of at least two distinct detection modes, i.e., a spreader mode and a non-spreader mode. In the spreader mode, the radar-based residue monitoring system is configured to emit a radar signal 210 with a waveform adapted for monitoring the spreading distribution of the chopped residue straw. In the non-spreader mode, the radar-based residue monitoring system is configured to emit a radar signal 210 with a waveform adapted for detecting vehicles or stationary obstacles.

Radar systems especially configured to detect small, fast moving objects like chopped straw from a residue spreader 74 may not be optimally configured to detect larger objects moving at relatively low speeds relative to the radar system. According to embodiments of the invention, the radar-based residue monitoring system may run in the spreader mode while the combine 10 is harvesting crop and chopping and spreading the crop residue over the field. Upon, for example, a user command, a signal from an approaching grain hauling vehicle 90, or an initial detection of the grain hauling vehicle 90 by the radar-based residue monitoring system, the controller may reconfigure the radar-based residue monitoring system to switch to the non-spreader mode, possibly in combination with pausing or redirecting the residue spreading. Alternatively, the non-spreader mode may be used only for very short periods of time without interrupting the operation of the spreader system 74. Such short periods of time in the non-spreader mode may be long enough to reliably detect the presence and position of the grain hauling vehicle 90. Even when used frequently, the short duration of the periods in the non-spreader mode will ensure that the proper functioning of the radar-based residue monitoring system is not adversely affected. For example, the radar sensors 76 may be operated in the spreader mode for ten cycles, followed by one or two cycles of operation in the non-spreader mode. When the radar-based residue monitoring system comprises multiple radar sensors 76, only a subset may be put into the non-spreader mode. The non-spreader mode 76 may be used primarily at the side of the combine harvester 10 where the unload conveyor 30 is located, because this is the side where the grain hauling vehicle 90 is expected to appear.

When the grain unloading process is completed and the grain hauling vehicle 90 moves away from the combine harvester 10, the combine harvester can resume its normal harvesting operation and the controller may bring the radar-based residue monitoring system back into the spreader-mode.

In addition to the use of the radar-based sensor system for detecting the presence or position of grain hauling vehicles 90, the radar sensors 76 may be made available for use in other ways, not directly related to measuring the particle size and spreading distribution of chopped crop residue. For example, the radar sensors 76 may be used as parking sensors while driving in reverse, or for detecting a lateral distance to standing crop to assist in steering the combine harvester 10 or determining an optimal spreading width.

Figure 3:
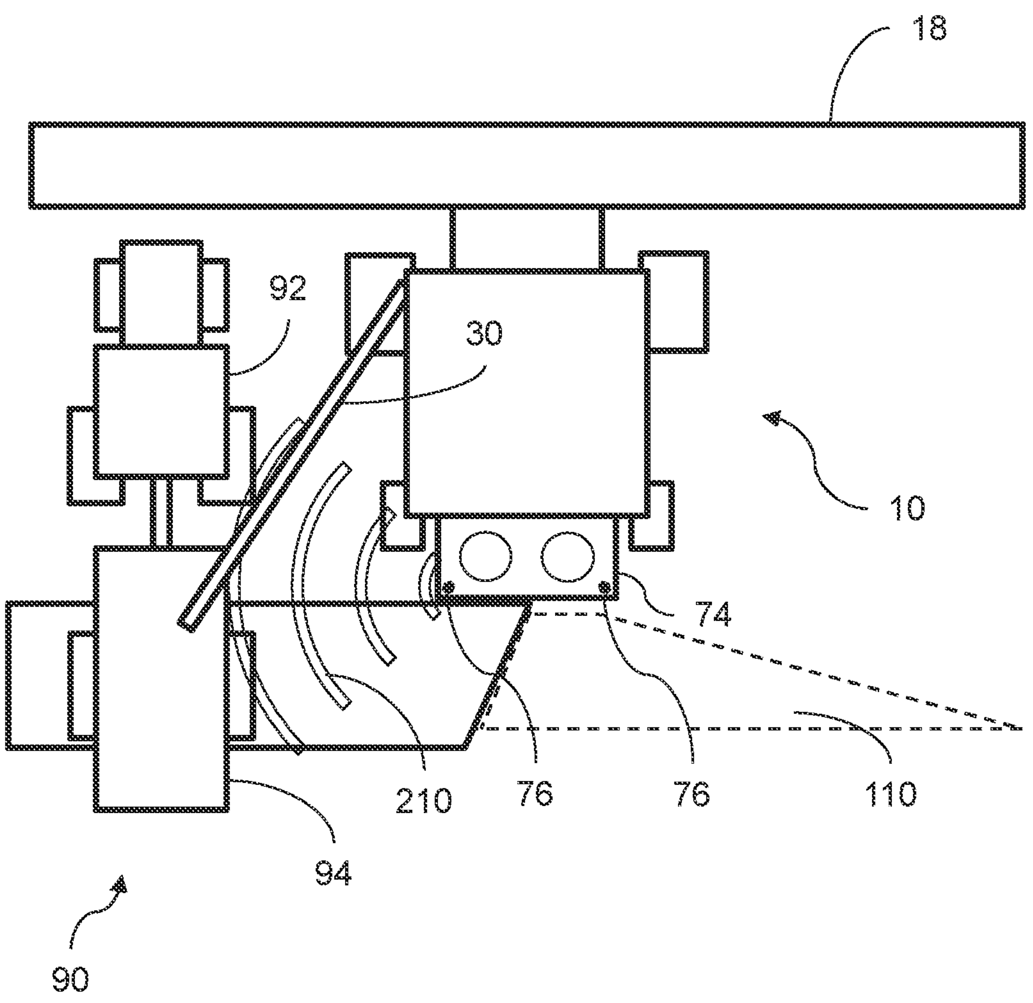
FIG. 3 schematically shows a grain hauling vehicle driving adjacent the combine harvester while receiving clean grain being unloaded from the grain tank of the combine harvester.

FIG. 3 schematically shows a grain hauling vehicle 90 driving adjacent the combine harvester 10 while receiving clean grain being unloaded from the grain tank 28 of the combine harvester 10. The relative position of the grain hauling vehicle 90, as detected with the use of one of the radar sensors 76 of the residue monitoring system, may be used to automatically or semi-automatically control the speed and direction of the combine harvester 10 and the tractor 92 pulling the trailer 94. In addition thereto, this information may be used to control the orientation of the unload conveyor 30 too. The operation of the spreader system 74 is temporarily adjusted to ensure that the spreading region 110 does not include the area where the grain hauling vehicle 90 is located. This may, e.g., be achieved by only using one of its two rotary spreaders, or by running the one nearest to the grain hauling vehicle 90 at a very low rotational speed. Because the spreader system 74 is spreading the chopped crop residue to one side of the combine harvester 10 only, the radar sensor 76 at the grain hauling vehicle side of the combine harvester 76 may be put into the non-spreader mode, while the radar sensor 76 at the other side is kept in the spreader mode.

The invention claimed is:

1. A combine harvester, comprising:

a grain tank for storing harvested grain, an unload conveyor for unloading the harvested grain stored in the grain tank into a nearby grain hauling vehicle, a chopper for chopping residue straw, a spreader system for spreading the chopped residue straw in an area behind the combine harvester, a radar-based residue monitoring system for monitoring a spreading distribution of the chopped residue straw, and a controller configured to:

receive sensor signals from one or more radar sensors of the radar-based residue monitoring system, and based on the received sensor signals, detect a presence of the nearby grain hauling vehicle, wherein the radar-based residue monitoring system is configured to be operated in one of at least two distinct detection modes, wherein:

in a spreader mode, the radar-based residue monitoring system is configured to emit a radar signal with a waveform adapted for monitoring the spreading distribution of the chopped residue straw, and in a non-spreader mode, the radar-based residue monitoring system is configured to emit a radar signal with a waveform adapted for detecting vehicles or stationary obstacles.

2. A combine harvester as claimed in claim 1, wherein the controller is further configured to determine a position of the nearby grain hauling vehicle relative to the combine harvester, based on the received sensor signals.

3. A combine harvester as claimed in claim 2, wherein the controller is further configured to control a driving speed and/or a driving direction of the combine harvester and/or the nearby grain hauling vehicle, in dependence of the relative position of the nearby grain hauling vehicle.

4. A combine harvester as claimed in claim 2, wherein the controller is further configured to control an orientation of the unload conveyor relative to the grain tank, in dependence of the relative position of the nearby grain hauling vehicle.

5. A combine harvester as claimed in claim 1, wherein the controller is further configured to control an operation of the spreader system, in dependence of the presence of the nearby grain hauling vehicle.

6. A combine harvester as claimed in claim 1, wherein the controller is configured to switch the radar-based monitoring system between the two distinct detection modes in dependence of the presence of the nearby grain hauling vehicle.

7. A combine harvester as claimed in claim 1, wherein the controller is configured to intermittently switch the radar-based monitoring system between the two distinct detection modes.

8. A method of controlling a combine harvester, the method comprising:

receiving sensor signals from one or more radar sensors of a radar-based residue monitoring system of the combine harvester, and based on the received sensor signals, detect a presence of a nearby grain hauling vehicle, the method further comprising:

switching between at least two distinct detection modes of the radar-based residue monitoring system, wherein:

in a spreader mode, the radar-based residue monitoring system emits a radar signal with a waveform adapted for monitoring the spreading distribution of chopped residue straw, and in a non-spreader mode, the radar-based residue monitoring system emits a radar signal with a waveform adapted for detecting vehicles or stationary obstacles.

9. A method of controlling a combine harvester as claimed in claim 8, further comprising determining a position of the nearby grain hauling vehicle relative to the combine harvester, based on the received sensor signals.

10. A method of controlling a combine harvester as claimed in claim 8, wherein the switching between the two distinct detection modes occurs in dependence of the presence of the nearby grain hauling vehicle.

11. A method of controlling a combine harvester as claimed in claim 8, wherein the switching between the two distinct detection modes occurs intermittently.

12. A method of controlling a combine harvester as claimed in claim 11, wherein the radar-based residue monitoring system repeatedly operates in the spreader mode for a first number of cycles, followed by a second number of cycles in the non-spreader mode.

13. A method of controlling a combine harvester as claimed in claim 12, wherein the first number and/or the second number are adapted in dependence of the presence of the nearby grain hauling vehicle.

14. A non-transitory, computer-readable storage medium storing instructions thereon that when executed by one or more processors cause the one or more processors to execute the method of claim 8.

15. A combine harvester, comprising:

a grain tank for storing harvested grain, an unload conveyor for unloading the harvested grain stored in the grain tank into a nearby grain hauling vehicle, a chopper for chopping residue straw, a spreader system for spreading the chopped residue straw in an area behind the combine harvester, a radar-based residue monitoring system for monitoring a spreading distribution of the chopped residue straw, and a controller configured to:

receive sensor signals from one or more radar sensors of the radar-based residue monitoring system, based on the received sensor signals, detect a presence of the nearby grain hauling vehicle, and control an operation of the spreader system, in dependence of the presence of the nearby grain hauling vehicle.

* * * * *